(12) United States Patent
Schuster et al.

(10) Patent No.: US 6,481,480 B1
(45) Date of Patent: Nov. 19, 2002

(54) CONVERTIBLE TREAD FOR A RADIAL TRUCK OR TRAILER TIRE

(75) Inventors: Daniel Edward Schuster, North Royalton, OH (US); John James Serich, Poland, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/180,738

(22) PCT Filed: Jun. 7, 1996

(86) PCT No.: PCT/US96/09636

§ 371 (c)(1),
(2), (4) Date: Nov. 12, 1998

(87) PCT Pub. No.: WO97/46400

PCT Pub. Date: Dec. 11, 1997

(51) Int. Cl.[7] .......................... B60C 11/11; B60C 11/12; B60C 11/13; B60C 101/00; B60C 103/00

(52) U.S. Cl. ............................ 152/209.18; 152/209.21; 152/209.22; 152/209.25; 152/209.27; 152/209.28; 152/902; 152/DIG. 3

(58) Field of Search ...................... 152/209.18, 209.21, 152/209.22, 209.24, 209.25, 209.27, 902, DIG. 1, DIG. 3, 209.28

(56) References Cited

U.S. PATENT DOCUMENTS

| | | | |
|---|---|---|---|
| 2,604,920 A | * 7/1952 | Kirby | |
| 4,223,712 A | 9/1980 | Iwata et al. | 152/209 D |
| 4,619,300 A | * 10/1986 | Tokunaga et al. | |
| 4,649,975 A | * 3/1987 | Kogure et al. | |
| 4,676,290 A | * 6/1987 | Tansei et al. | |
| 4,703,788 A | * 11/1987 | Kusube et al. | |
| 4,732,195 A | 3/1988 | Takeuchi | 152/209 R |
| 4,854,358 A | 8/1989 | Takeuchi | 152/209 R |
| 5,417,268 A | * 5/1995 | Kishi | |
| 5,492,161 A | 2/1996 | Fuchikami et al. | 152/209 R |
| 5,660,652 A | * 8/1997 | Young et al. | |

FOREIGN PATENT DOCUMENTS

| | | | |
|---|---|---|---|
| EP | 0230765 | | 8/1987 |
| EP | 333397 | * | 9/1989 |
| GB | 2003804 | | 3/1979 |
| JP | 58-156405 | * | 9/1983 |
| JP | 1-215604 | * | 8/1989 |
| JP | 5-162511 | * | 6/1993 |
| JP | 6-87303 | * | 3/1994 |
| JP | 7-266807 | * | 10/1995 |
| SU | 998140 | * | 2/1983 |

* cited by examiner

*Primary Examiner*—Steven D. Maki
(74) *Attorney, Agent, or Firm*—David L. King

(57) ABSTRACT

A radial ply pneumatic tire 10 for trucks or trailers has a tread 12 with at least three circumferential grooves 20,22 extending circumferentially to divide the tread 12 into at least four parts and lateral grooves 30,31,32,33,34 extending across the at least four parts of the tread to form at least four rows 1,2,3,4 and 5 of circumferentially separated blocks 40. The circumferential grooves 20,22 have average groove widths of $W_1$ for a depth between the radially outer surface of the adjacent blocks and a groove depth that is less than 60% of the non-skid depth D, the circumferential grooves having a second average groove width $W_2$ at the groove depth less than 60% of the non-skid depth D, the second average groove width $W_2$ being less than 50% of $W_1$. The lateral grooves 30,34 in each shoulder row 15 have a first average groove width $W_3$ and a groove depth that is less than 60% of the non-skid depth D. The lateral grooves 31,32,33 in the central rows 2,3 and 4 have a first average length $L_1$ for a depth between a radially outer surface of the adjacent blocks and a groove depth that is less than 60% of the non-skid depth D, the lateral grooves in the central rows having a second average length $L_2$ at the groove depth that is less than 60% of the non-skid depth D, the second average length $L_2$ being greater than the first average length $L_1$. The tie 10 when new, provides a tread 12 for the drive axle position and when less than 60% worn, the tread pattern changes to one ideally suited for the trailer wheel position.

7 Claims, 4 Drawing Sheets

CONVERTIBLE TREAD FOR A RADIAL TRUCK OR TRAILER TIRE

TECHNICAL FIELD

This invention relates to the field of heavy duty radial pneumatic tires for trucks and truck trailers.

BACKGROUND ART

In many areas of the world, heavy duty vehicles such as trucks must have superior traction performance on the drive axle positions of the vehicle. Tires having sufficiently aggressive tread patterns with block element type tread patterns seem to provide the best traction performance.

As the tread becomes about half worn these block elements can lose some of their traction capability or performance. Ideally, the drive axle tires would be replaced at that time. Unfortunately, for the vehicle owner this means that the tread still had a useful half life remaining if it could be used in a less traction sensitive wheel position. Unfortunately, the original tread pattern when worn was not conducive to such applications such as trailer tires.

The need was apparent that tread patterns must change or convert when worn partially to a different pattern if they were to be successfully used in other wheel positions.

The use of convertible truck tires which start out having one block type tread pattern and as the tire reached a certain level of wear changed to a rib type tire was taught in U.S. Pat. No. 4,223,712 wherein less than full depth inclined transverse grooves would disappear after the tire was 30% to 70% worn.

A later U.S. Pat. No. 4,732,195 issued Mar. 22, 1988, taught that the transverse grooves should disappear toward the axially outside of the tread so that the separated blocks change into continuous ribs from the axially outside to the inside of the tread in sequence as the tread wears.

In U.S. Pat. No. 4,854,384 issued Aug. 8, 1989, taught a block type tread pattern which is also converted to a rib type tire when the tire is worn in the range of 35% to 75% of the maximum depth. The tread has a plurality of circumferentially continuous zig-zag and straight grooves which have a total width equal to 15–35% of the entire tread width when the tire is new and 10–25% of the entire tread width when the tire is worn and the transverse grooves completely disappear to form a rib pattern consisting solely of zig-zag longitudinal grooves.

In these patents the tread pattern simply was converted from block elements to ribs by the loss of the transverse groove.

These rib type tires generally will exhibit uniform wear and can be used where traction must be achieved by zig-zagging the longitudinal grooves. Historically, such tires have relatively poor braking traction when used on wet or snowy roads.

The present invention in a unique way converts a block element tread pattern for drive axles of trucks when the tire is half worn to a combination of shoulder ribs and central rows of larger block elements which can exhibit substantially superior wet traction capability than the prior art ribbed type tires.

DISCLOSURE OF THE INVENTION

A radial ply pneumatic tire 10 for trucks or trailers having a tread 12 with at least three longitudinal grooves 20,22 that extend circumferentially to divide the tread 12 into at least four parts is disclosed, more preferably 5 parts divided by four longitudinal grooves 20,22. The tread 12 has lateral grooves 30,31,32,33,34 extending across the at least four parts of the tread 12 to form at least four rows 1,2,3,4,5 of circumferentially separated blocks 40 including two shoulder rows 1,5 and at least two, preferably three central rows 2,3,4. Each block 40 has a radially outer surface 42.

The longitudinal grooves 20,22 have an average width $W_1$ between the radially outer surface 42 of the tread blocks 40 extending to a depth of less than 60% of the total tread depth D thereafter the average width of the longitudinal grooves 20,22 narrows to less than 50% of $W_1$ and the lateral grooves 30,34 in each shoulder row extends to a depth of less than 60% of the total tread depth.

The lateral grooves in the central rows 31,32,33 have an average length of $L_1$ between the radially outer surface 42 of the tread blocks 40 to a depth of less than 60% of the total depth D, thereafter the lateral grooves 31,32,33 average length increases to greater than $L_1$, preferably to $L_1$+50% of $W_1$ in length. The average groove width of the lateral grooves 31,32,33 in the central rows equals $W_3$, the width $W_3$ being measured between the radially outer surface 42 of the block 40 to a depth of less than 60% of the total depth D, thereafter the lateral grooves narrow to an average width $W_4$ of less than 80% of $W_3$ for the remainder of the groove depth, preferably less than 50% of $W_3$.

These changes in average groove widths $W_1$ of the longitudinal grooves 20,22 and the average groove widths $W_3$ of the central row lateral grooves 31, 32, 33 to less than 50% $W_1$ and less than 80% $W_3$, respectively, preferably occurs at the same depth. Furthermore, it is preferred that the lateral grooves 30,34 in the shoulder rows 1,5 cease at the same depth wherein the longitudinal and the lateral grooves narrow.

It is further believed important that the longitudinal and lateral grooves change average width at 40% or more of the total depth D of the tread 12.

In the preferred embodiment tire each block element has at least one sipe 51,52,53 and a portion of the sipe 51,52,53 remains in the tread 12 after the width of the longitudinal 20,22 and lateral grooves 31,32,33 narrows due to the tire 10 being worn.

The tire 10 when new preferably has a net-to-gross ratio of less than 70% which increases by at least 10% at the depth of the tread where the average groove widths narrow, preferably increasing by almost 20%.

Definitions

"Aspect ratio" of the tire means the ratio of its section height (SH) to its section width (SW) multiplied by 100% for expression as a percentage.

"Asymmetric tread" means a tread that has a tread pattern not symmetrical about the centerplane or equatorial plane EP of the tire.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to the tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Inboard side" means the side of the tire nearest the vehicle when the tire is mounted on a wheel and the wheel is mounted on the vehicle.

"Lateral" means an axial direction.

"Net contact area" means the total area of ground contacting elements between defined boundary edges divided by the gross area between the boundary edges as measured around the entire circumference of the tread.

"Net-to-gross ratio" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning. "Axial" and "axially" means lines or directions that are parallel to the axis of rotation of the tire.

"Non-Skid Depth" means the full depth on total depth of the tread from the surface of the tread to the bottom of the deepest groove.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction.

"Tread element" or "traction element" means a rib or a block element.

DETAILED DESCRIPTION OF THE INVENTION

Figure 1:
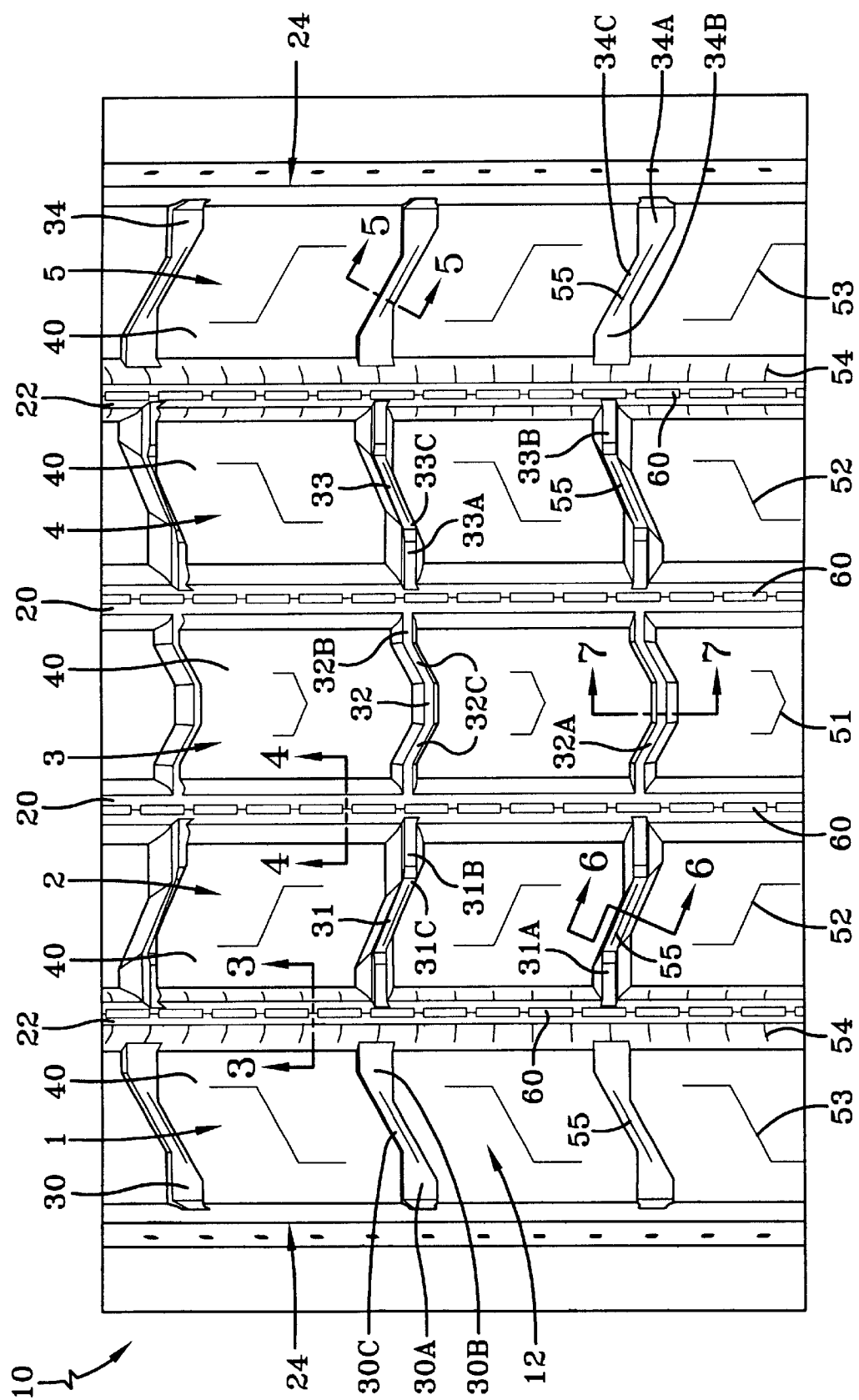
FIG. 1 is a developed fragmentary plan view of a preferred embodiment tire having a block type tread pattern according to the invention.

With reference to FIG. 1 there is shown a fragmentary plan view of the preferred embodiment tire 10. The tire 10 has a tread 12 having at least three longitudinal grooves 20,22 dividing the tread into at least four parts. As illustrated, the tread 12 of the preferred tire has four such longitudinal grooves 20,22 dividing the tread into five parts. The tread 12 has a plurality of lateral grooves 30,31,32,33, 34 extending across each part and dividing the parts forming at least four, as illustrated five rows 1,2,3,4,5, of circumferentially separated blocks 40.

Each block 40 has at least one sipe 51,52,53. Several of the transverse grooves 30,31,33 and 34 have a sipe 55. Numerous short lateral sipes 54 are closely spaced and positioned on a radially inner portion of the block elements 40 adjacent shoulder grooves 22.

A plurality of stone penetration protectors 60 are shown extending from the base of the circumferential grooves 20,22. These features help protect the tire from having small stones or rocks from penetrating through the base of the grooves 20,22, and thus exposing the underlying reinforcing belt structure.

Figure 3:
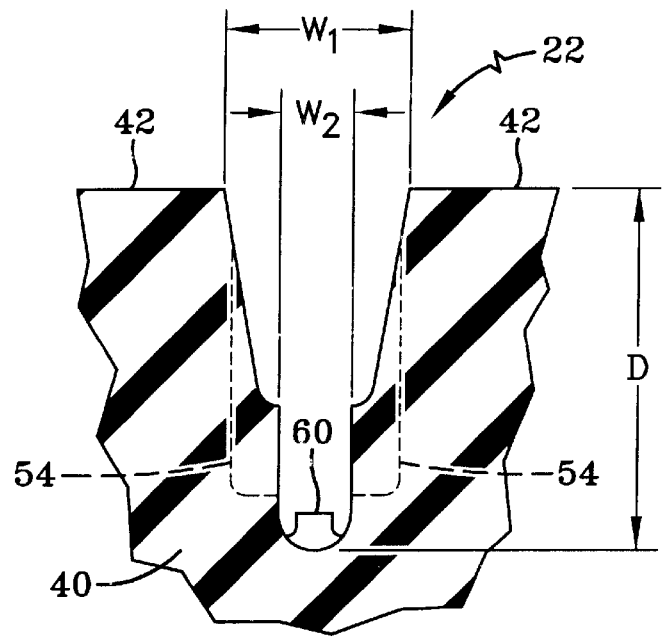
FIGS. 3–7 are cross sectional views taken of the various longitudinal and lateral grooves.
Figure 4:
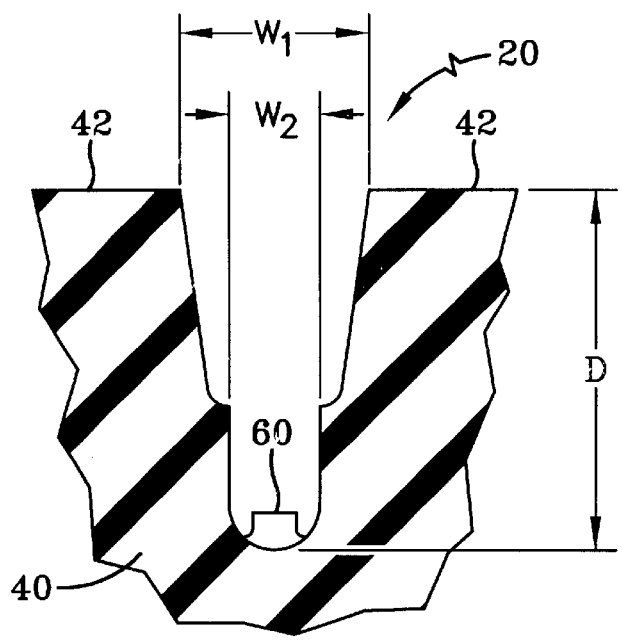

As illustrated, the longitudinal grooves 20,22 are straight and as shown in cross sectional views of FIGS. 3 and 4 have full depths D (excluding tread wear indicators and the stone penetration protectors 60). The full depth D is commonly referred to as the non-skid depth of the tread.

Each groove 20, 22 has a first average groove width $W_1$ before the tread 12 is worn as shown in FIG. 1, the adjacent tread blocks 40 to a depth less than 60% of the total depth D. Thereafter, the width of the grooves 20,22 substantially narrow to a width of less than 50% of $W_1$, as shown about 30% of $W_1$.

Figure 5:
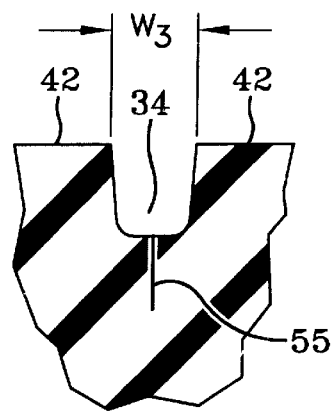
Figure 6:
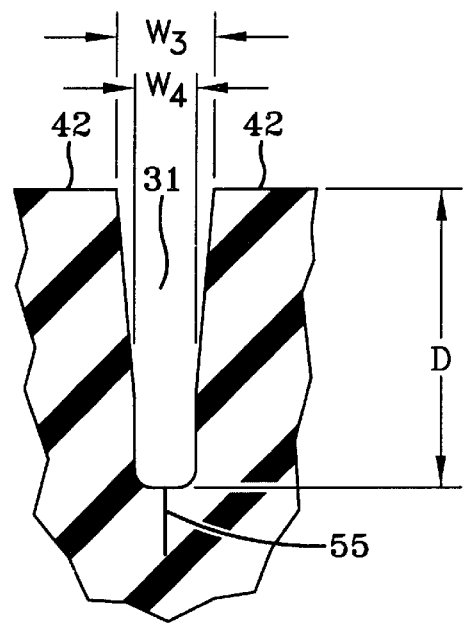
Figure 7:
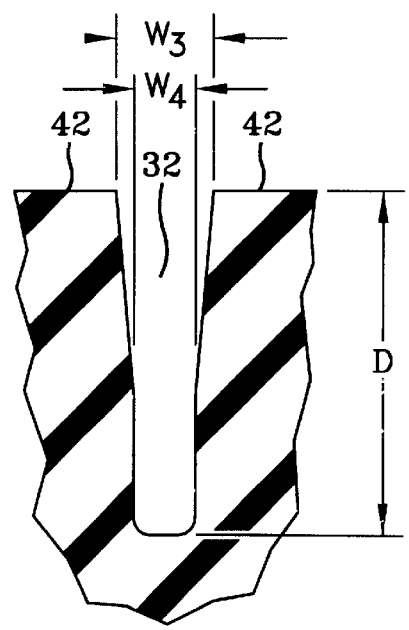

With reference to the cross-sectional views of FIGS. 5–7, the cross-sectional shape of the various lateral grooves 30,31,32,33,34 are shown. In each case, the lateral groove has a first average width designated $W_3$ which is measured between the radially outer surfaces 42 of the adjacent blocks 40 to a depth of less than 60% of the depth D.

In the shoulder rows 1 and 5, the lateral grooves stop at the groove depth of less than 60% of the depth D. As shown, these grooves extend radially inward from the tread surface at least 40% of D. Beyond that depth the groove ceases and the shoulder rows become solid shoulder ribs.

With reference to the blocks 40 of the central rows 2,3 and 4, the lateral grooves 31,32,33 each has an average groove width designated $W_2$, $W_2$ being between the radially outer surface 42 of the block 40 to a depth of less than 60% of D and preferably to a depth of at least 40% of D. Thereafter, a majority of the lateral grooves 31,32,33 preferably all the lateral grooves narrow to a width less than $W_2$ for its respective lateral groove, more preferably narrowing by about 80% less than the original $W_2$.

Figure 2:
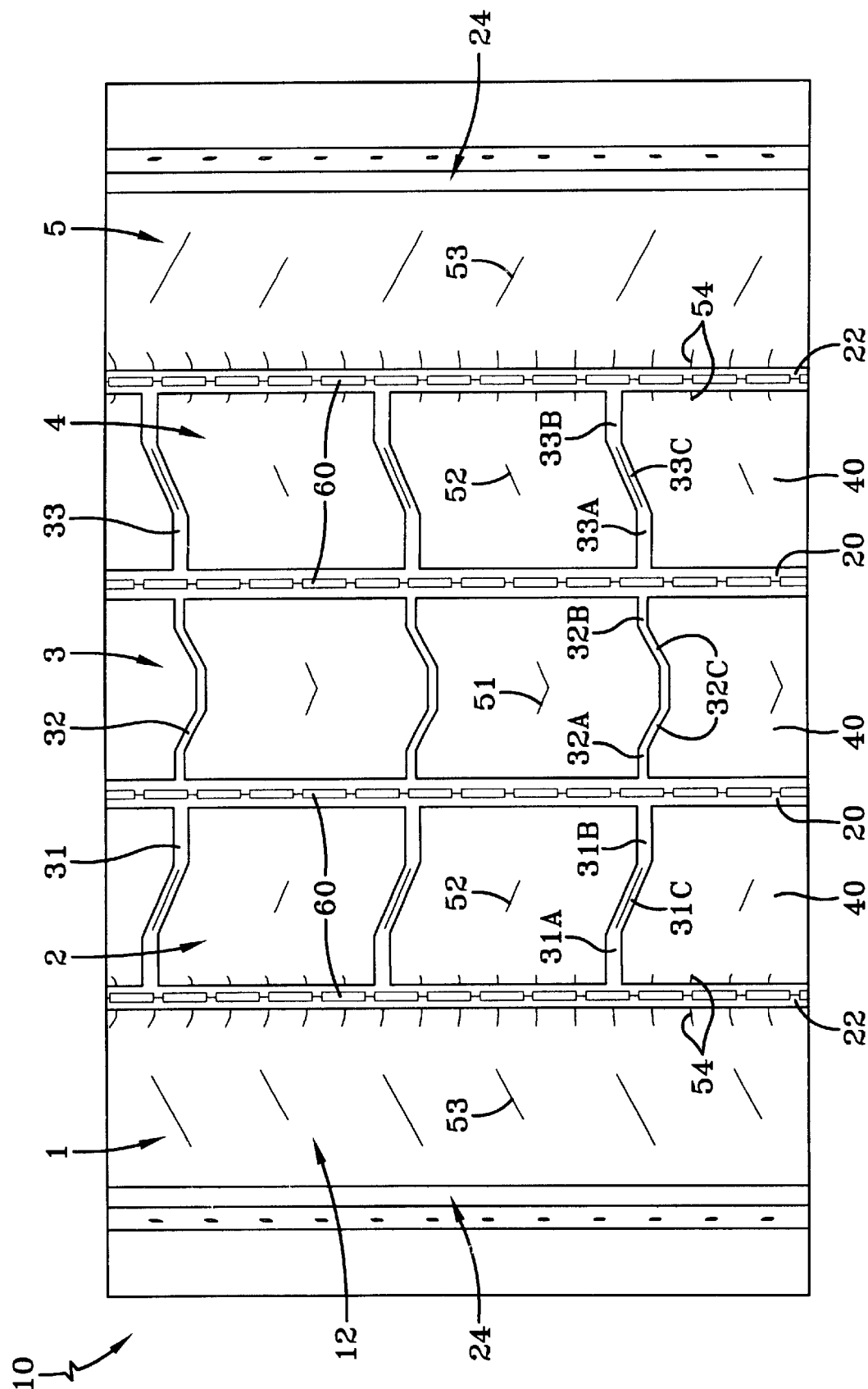
FIG. 2 is a plan view of the tire of FIG. 1 after tread wear has caused the conversion of the tread pattern to the two shoulder ribs with central rows of enlarged blocks.

By measuring along the radially outer surface 42 of each block 40 adjacent to a particular lateral groove one can determine the average length of the lateral groove, each such average length being designated $L_1$. As the tread 12 wears to a location wherein the longitudinal grooves 20,22 narrow the lateral grooves in the central rows 2,3 and 4 actually increase in length. As shown in FIG. 2 the length increases from $L_1$ to a length of $L_1$+greater than or equal to 50% of $W_1$. As shown each lateral groove 31,32,33 increased by an amount equal to about ⅔ of $W_1$ in the central rows.

Further inspection of FIG. 2 shows that the net-to-gross ratio of the preferred tire increased to about 85% from the original or new tire net-to-gross ratio of about 68%. It is believed that the new tire net-to-gross ratio should be at or below 70% and after wearing down the tread depth to between 40% and 60% of D, the narrowing or elimination of the grooves should result in at least a 10% preferably 15% or more increase in the net-to-gross contact ratio.

This increase in tread rubber in contact with the road surface greatly retards the rate of tread wear. The fact that the lateral grooves 31,32,33 in the central rows are effectively much longer means that the tractive efficiency is also maintained at a higher rate than the earlier mentioned prior art rib type tires. Furthermore, the wet traction performance of the inventive tire is enhanced by the combination of the long lateral grooves and the straight longitudinal grooves. The use of straight longitudinal grooves 20,22 along with a plurality of blocks having lengthened lateral grooves markedly increases the tractive performance of the worn tire. The generous use of lower level sipes 54, and 55, along with maintaining portions of sipes 51,52,53, also positively contribute to traction performance.

The sipes 54 are as shown in dashed lines of cross-sectional view in FIG. 3. The sipes originate in the area of the groove walls adjacent the circumferential groove 22. The sipes are at or slightly below the intersection of the groove wall and the radially outer surface 42 of the block element 40 and extend radially inwardly to a location at, or slightly above, the base of the groove, preferably above the base of the groove or above the stone penetration protectors 60. As the tread 12 wears these sipes 54, which are originally partially hidden in the grooves 22, are exposed. When the tread reaches the transition point of wear, the sipes 54 are then fully laterally exposed and they become functionally important. At that level of tread wear the tire tread is converted to a pattern useful on free rolling axles of vehicles such as trailers. These sipes 54 help in retarding the initiation of riverwear that is a common occurrence in the blocks or ribs of such tires in the location designated in rows 2 and 4 at the axially outer portions adjacent grooves 22.

Although the block elements 40 of FIG. 1 and FIG. 2 are shown almost aligned in a circumferential direction, it is believed that it may be desirable to stagger the rows 1,2,3, 4,5 so that the axially adjacent blocks are more circumferentially offset.

Another important feature of this invention is the groove 24 shown in FIG. 1 as a line 24. As the tread wears, this narrow straight circumferential groove, which is initially not readily observable, becomes observable when the drive axle tread pattern is fully worn, that is as shown in FIG. 2 at the 40% to 60% worn condition earlier discussed. At that level of wear, the trailer pattern is fully exposed as well as this narrow groove 24. This narrow groove functions as a pressure distribution groove which helps reduce or eliminate the occurrence of chamfer wear common in the free rolling axle position of tires used on truck trailers.

Another important feature is that each of the lateral grooves have their first and second ends 30A,30B, 31A,31B, 32A,32B,33A,33B,34A,34B oriented perpendicular to the longitudinal direction and having one or more straight inclined portions oriented about 45° or more relative to the longitudinal direction. This configuration insures that a large portion of the lateral grooves are perpendicularly oriented to the direction of forward travel. This greatly improves wet and dry braking traction.

As can be appreciated from the above description, this tire according to the invention does not compromise the traction performance of the shoulder ribs and central block type pattern in the 60% worn condition. Great attention has been given to enhancing both the traction and the wear properties of the worn tread. The conversion for one aggressive drive axle type tread to a trailer type tread having an aggressive combination of shoulder ribs and enlarged central row blocks makes the tire according to the present invention superior to those of the prior art.

What is claimed is:

1. A radial ply pneumatic tire for trucks and trailers having a tread with a non-skid depth D, at least three circumferential grooves extending circumferentially to divide the tread into at least four parts, lateral grooves extending across the at least four parts of the tread to form at least four rows of circumferentially separated blocks, including two shoulder rows, and at least two central rows, each block having a radially outer surface, the tire characterized by:

the circumferential grooves having a first average groove width $W_1$ for a depth between the radially outer surface of the adjacent blocks and a groove depth that is less than 60% of the non-skid depth D, the circumferential grooves having a second average groove width $W_2$ at the groove depth that is less than 60% of the non-skid depth D, the second average groove width $W_2$ being less than 50% of the first average groove width $W_1$, the lateral grooves in each shoulder row having a first average groove width $W_3$ and a groove depth of less than 60% of the non-skid depth D, the lateral grooves in the central rows having a first average length of $L_1$ for a depth between the radially outer surface of the adjacent blocks and a groove depth that is less than 60% of the non-skid depth D, the lateral grooves in the central rows having a second average length $L_2$ at the groove depth that is less than 60% of the non-skid depth D, the second average length $L_2$ being greater than the first average length $L_1$, the lateral grooves in the central rows having a second average groove width $W_4$ at the groove depth that is less than 60% of the non-skid depth D, and wherein the second average groove width $W_2$ of the circumferential grooves and the second average groove width $W_4$ of the lateral grooves in the central rows occur at the same radial depth, the lateral grooves in the shoulder rows cease at the same depth that the second groove widths $W_2$ and $W_4$ occur when the tread is worn to the location at which widths $W_2$ and $W_4$ occur, thereby forming two shoulder ribs and at least two central rows of circumferentially spaced blocks.

2. The radial ply pneumatic tire for trucks and trailers of claim 1 wherein the tire has an initial net-to-gross ratio of less than 70%, which increases by at least 10% at the groove depth at which the second average groove widths $W_2$ and $W_4$ occur.

3. The radial ply pneumatic tire for trucks and trailers of claim 1 wherein the second average length $L_2$ equals the first average length $L_1$+ at least 50% of the first average groove width $W_1$.

4. The radial ply pneumatic tire for trucks and trailers of claim 1 wherein each block element has at least one sipe, a portion of the sipe remains in the tread after the width of the circumferential and lateral grooves narrows due to the tire being worn to the location at which $W_2$ and $W_4$ occur.

5. The radial ply pneumatic tire for trucks and trailers of claim 1 where the central row lateral grooves in the 60% or more worn condition are oriented perpendicular to the direction of travel over more than half of their length.

6. The radial ply pneumatic tire for trucks and trailers of claim 1 wherein the circumferential grooves axially inward and adjacent to one of the shoulder rows have groove walls having numerous lateral extending sipes that appear as the tread wears.

7. The radial ply pneumatic tire for trucks and trailers of claim 1 wherein at a location axially outward of the shoulder row of blocks and radially inward thereof lies a narrow circumferentially straight groove that appears as the tread wears.

* * * * *